United States Patent [19]
Sears

[11] Patent Number: 6,072,405
[45] Date of Patent: Jun. 6, 2000

[54] METER TRANSMISSION UNIT FOR USE WITH A PIT SET UTILITY METER

[76] Inventor: Lawrence M. Sears, 45006 Mather La., Hunting Valley, Ohio 44022

[21] Appl. No.: 09/059,323

[22] Filed: Apr. 13, 1998

[51] Int. Cl.[7] .................................................. G08B 23/00
[52] U.S. Cl. .............................. 340/870.02; 340/870.03; 361/659; 361/667
[58] Field of Search .................. 340/870.02, 870.03; 361/659, 667, 616; 73/273, 277, 272 A

[56] References Cited

U.S. PATENT DOCUMENTS

| | | | |
|---|---|---|---|
| 5,298,894 | 3/1994 | Cerny et al. | 340/870.02 |
| 5,825,303 | 10/1998 | Bloss, Jr. et al. | 340/870.02 |
| 5,877,703 | 3/1999 | Bloss, Jr. et al. | 340/870.02 |

*Primary Examiner*—Michael Horabik
*Assistant Examiner*—Timothy Edwards, Jr.

[57] ABSTRACT

A meter transmission unit for transmitting a signal indicative of utility usage at a utility meter which is adapted for use with a pit set utility meter located in a pit having a cover and an opening therein for supporting the meter transmission unit and a method of installing the meter transmission unit. The meter transmission unit includes a tubular housing having a detachable flange at one end thereof for supporting the meter transmission unit on the pit cover and includes an annular collar having vertical adjustment means extending through the annular collar for engaging with the bottom of the pit cover to pull the flange tightly toward the top surface of the pit cover.

25 Claims, 3 Drawing Sheets

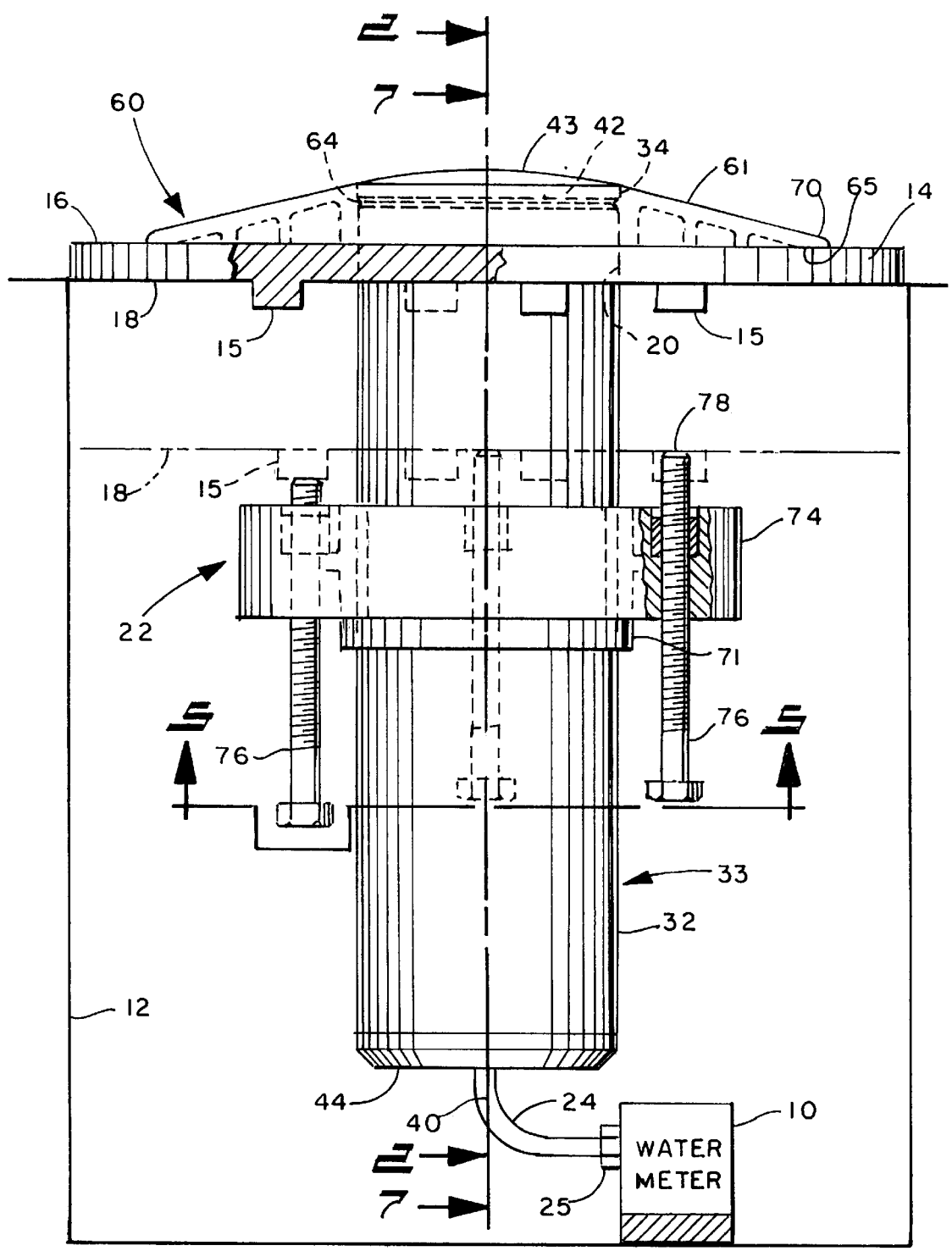

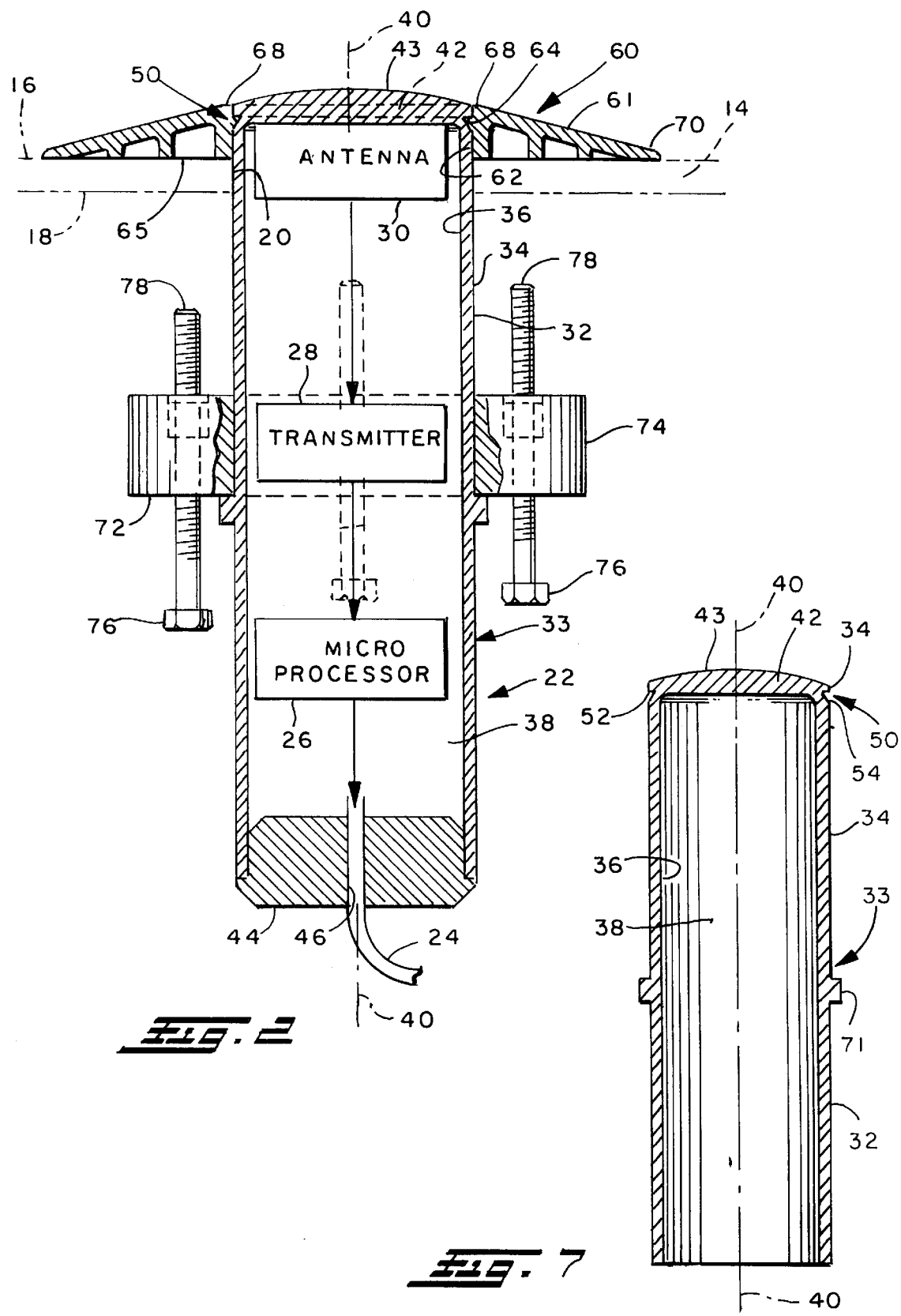

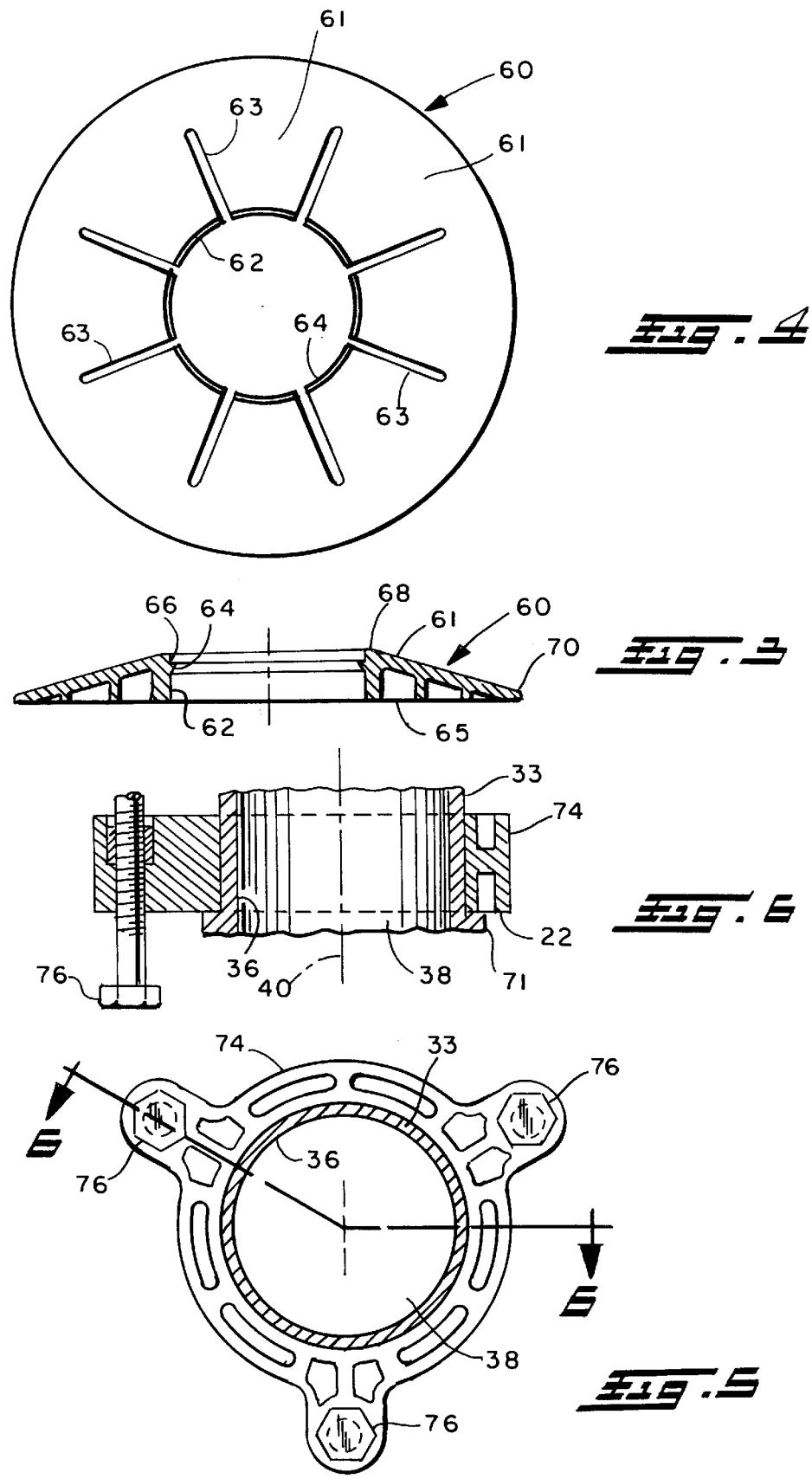

METER TRANSMISSION UNIT FOR USE WITH A PIT SET UTILITY METER

DESCRIPTION-TECHNICAL FIELD

The present invention relates to a meter transmission unit for use with a utility meter installed underground in a "pit or vault", i.e., "pit set" utility meter and more particularly to a meter transmission unit which is economical to manufacture and ship and which is easily installed and adjustable to tightly fit within an opening in the pit cover.

BACKGROUND OF THE INVENTION AND REFERENCE TO RELATED PATENTS

Meter reading systems for reading utility usage at a utility meter are well known, examples of which are disclosed in the Sears U.S. Pat. No. 4,463,354 entitled, "Apparatus for Communicating Utility Usage Related Information From a Utility Usage Location to a Portable Utility Usage Registering Device" and in the Sears U.S. Pat. No. 5,617,084 entitled "Apparatus for Communicating Utility Usage Related Information From a Utility Usage Location to a Utility Usage Registering Device" both of which are incorporated by reference herein. These utility meter reading systems and other types of utility meter reading systems utilize meter transmission units which are located at and connected to an individual utility meter at which it is desired to collect utility usage information.

Some utility meters commonly referred to as "pit set" utility meters are located in an underground pit and it is a requirement for the meter transmission units which are associated with pit set meters to be located within an opening in the pit cover with the meter transmission unit extending into the pit and supported by the pit cover.

Meter transmission units for use with pit set meters have particular requirements and problems associated with the use of the meter transmission units in an underground pit. The meter transmission units are normally supported in an opening in the cover of the pit. The pit covers are constructed of concrete, plastic or metal which can interfere with the transmission of signals from the meter transmission unit. Accordingly, it is important that the antenna from the meter transmission unit extend through the opening in the pit cover to insure reliable transmission of data from the meter transmission unit. Additionally, the bottom surface of the pit cover in many cases is irregular. Since the pit set meters are frequently located in sidewalks and streets, the covers must be sufficiently rigid to allow traffic to pass over the pit cover without damage thereto. Frequently, ribbed structures are provided on the bottom surface of the pit cover to reinforce the pit cover, further increasing the non-uniformity of the bottom surface of the pit cover which in the prior art created problems in rigidly securing the meter transmission unit within the opening in the pit cover. The meter transmission unit must extend through the top surface of the pit cover to provide for reliable data transmission and must also be impervious to traffic flow over the pit cover. This is a particular problem when snowplow blades pass over the pit cover. The meter transmission unit can not extend above the pit cover to an extent that it would be damaged by a snow plow or other vehicular traffic.

In addition, the sensor portion of the meter transmission unit is generally spaced apart from the main housing of the meter transmission unit. The sensor portion is connectable to the utility meter to sense utility usage and is connected to the main housing of the meter transmission by a plurality of conductors. It is desirable to permanently connect the conductors between the main housing and sensor when manufacturing the meter transmission unit to insure proper sealing where the conductors pass into the main housing and into the sensor housing. It has been found to be problematical when the sensor unit was connected to the main housing in the field due to unreliable connectors and unreliable seals and the harsh wet environment to which such seals and connectors were subjected.

The present invention overcomes the disadvantage associated with the prior art pit set meter transmission units by providing an economical meter transmission unit for use with a pit set utility meter which is readily secured through an opening disposed in the pit cover, which is readily adjustable to tightly fit the meter transmission unit within the opening in the pit cover when the pit cover has an irregular bottom surface and wherein the sensor portion of the meter transmission unit is permanently connected to the main housing of the meter transmission unit. In addition, the meter transmission unit is constructed in a fashion which reduces shipping costs by allowing the meter transmission unit to be partially disassembled for shipping. Additionally, the meter transmission unit is impervious to traffic such as snowplows and snowplow blades passing over the surface of the meter transmission unit.

SUMMARY OF THE INVENTION

The present invention provides a new and improved meter transmission unit for transmitting a signal indicative of utility usage at a utility meter with which the meter transmission unit is associated and which is adapted for use with a pit set utility meter which is located in a pit having a pit cover for covering the top of the pit in which the utility meter is set and wherein the pit cover has a top surface, a bottom surface and an opening therein in which the meter transmission unit is supported. The meter transmission unit includes a sensor for sensing utility usage, a microprocessor connected to the output of the sensor for storing the utility usage information, a transmitter for transmitting a signal indicative of utility usage related information, an antenna for propagating the signal and a tubular housing having a longitudinal axis and first and second ends. The tubular housing is defined by a cylindrical wall having an inner surface which in part defines a chamber in which the microprocessor, the transmitter and the antenna are located. The cylindrical wall has a diameter which is slightly less than the diameter of the opening in the pit cover to allow at least a portion of the tubular housing to pass through the opening in the pit cover. Groove means are located in the first end of the tubular housing for supporting the tubular housing and a detachable annular flange is provided for surrounding and engaging with the first end of the tubular housing to support the tubular housing on the top surface of the pit cover. The detachable annular flange has a cylindrical opening centrally located therein for receiving the first end of the tubular housing and projection means which are adapted to be received within the groove means to support the tubular housing within the cylindrical opening in the annular flange and within the opening in the pit cover when the annular flange is located on the top surface of the pit cover. A collar surrounds the outer surface of the substantially cylindrical wall and abutment means are located on the outer surface of the cylindrical wall for engaging with the collar and limiting axial movement of the collar relative to the tubular housing. A plurality of adjustment means extend between the collar and the bottom surface of the pit cover for forcing the collar against the abutment means to bias the tubular housing in a direction away from the bottom surface of the pit cover to force the detachable annular flange tightly toward the top surface of the pit cover.

Another provision of the present invention is to provide a new and improved meter transmission unit for transmitting a signal indicative of utility usage at a utility meter which is adapted for use with a pit set utility meter which is located in a pit having a cover for covering the top of the pit in which the utility meter is located, the pit cover having a top surface, a bottom surface and an opening for supporting the meter transmission unit therein. The meter transmission unit includes a sensor for sensing utility usage, a microprocessor for storing utility usage information, a transmitter for transmitting a signal indicative of utility usage-related information, an antenna for propagating the signal and a tubular housing defined in part by a substantially cylindrical wall disposed substantially coaxial to the longitudinal axis of the tubular housing. The cylindrical wall includes an outer surface and an inner surface which defines in part a chamber in which the microprocessor, the transmitter and the antenna are located. The cylindrical wall has a diameter which is slightly less than the diameter of the opening in the pit cover to allow at least a portion of the tubular housing to pass through the opening in the pit cover. Groove means are located in the first end of the tubular housing for supporting the tubular housing in the pit cover. The detachable annular flange is provided for surrounding and engaging with the first end of the tubular housing to support in the opening of the pit cover the tubular housing on the top surface of the pit cover. The detachable flange includes a cylindrical opening centrally located therein for receiving the first end of the tubular housing therein and projection means located within the cylindrical opening which are adapted to be received within the groove means on the tubular housing to support the tubular housing within the cylindrical opening and the detachable flange is supported on the top surface of the pit cover. The detachable flange has a substantially conical surface which at one end is substantially flush with the first end of the tubular housing when the tubular housing is supported within the cylindrical opening in the detachable flange.

DESCRIPTION OF THE INVENTION

FIG. 1 is a side view of the meter transmission unit supported on a pit cover which covers a pit in which a pit set meter is located.

FIG. 2 is a side cross-sectional view more fully illustrating the meter transmission unit taken approximately along the lines 2—2 of FIG. 1.

FIG. 3 is a cross-sectional view of the detachable annular flange when removed from the housing of the meter transmission unit.

FIG. 4 is a top view of the detachable annular flange of FIG. 3.

FIG. 5 is a bottom view of the annular collar taken approximately along the lines 5—5 of FIG. 1.

FIG. 6 is a cross-sectional view of the annular collar of FIG. 5 taken approximately along the lines of 6—6 of FIG. 5.

FIG. 7 is a side cross-sectional view of the tubular housing taken approximately along the lines of 7—7 of FIG. 1 showing the annular collar and detachable annular flange removed.

DESCRIPTION OF THE PREFERRED EMBODIMENT

Referring to the Figures, and more particularly to FIGS. 1 and 2, a preferred embodiment of the meter transmission unit 22 of the present invention is illustrated for use with a pit set utility meter 10 located in a pit 12 in the ground. The utility meter 10 is preferably a water meter, but could be any other type of pit set utility meter such as a gas or electric meter. Meter 10 is located in the pit 12 which includes a pit cover 14 which closes the top of the pit. The pit cover 14 has a top surface 16 and a bottom surface 18 and an opening 20 disposed therein for receiving the meter transmission unit 22 of the present invention. The pit cover 14 can be of various thicknesses and the minimum pit cover thickness is represented by the full line 18 and the maximum pit cover thickness is represented by the phantom line 18 in FIG. 1.

The meter transmission unit 22, includes a sensor 25. The sensor 25 is connected to the utility meter 10 to sense utility usage information at the meter 10. The sensor 25 transmits a signal via conductors 24 to a microprocessor 26 which stores therein information indicative of utility usage sensed at meter 10 and information such as identification of the particular meter with which the meter transmission unit 22 is associated, alarm conditions and other useful information. The microprocessor 26 directs a signal indicative of the utility usage information to a transmitter 28 which transmits the signal to a receiver not illustrated. An antenna 30 is connected to the output of the transmitter 28 for propagating the signal to the receiver. The receiver is adapted to receive the signal from the meter transmission unit 22 and forward the information for processing by the utility for billing, maintenance and other uses.

The conductors 24 are preferably permanently connected to the sensor 25 and to the microprocessor 26 which is located in tubular housing 33 during manufacture of the meter transmission unit 22. The environment at a pit set meter 10 is harsh and wet and permanent connection of the wires 24 to the sensor 25 and the microprocessor 26 disposed within tubular housing 33 allows for better sealing of the conductors 24, sensor 25 and housing 33 than if splices were made in the conductors 24 at installation or than if connectors were used to connect conductors 24 to the sensor 25 and/or the meter transmitting unit 22.

The sensor 25, microprocessor 26, transmitter 28, and an antenna 30 can be the same as those or similar to those more fully disclosed in the Sears U.S. Pat. Nos. 4,463,354 and 5,617,084, which are incorporated herein by reference.

The meter transmission unit 22 includes tubular housing 33 which has a longitudinal axis 40 and which is defined in part by a cylindrical wall 32 having an outer cylindrical surface 34 and a inner cylindrical surface 36 which in part defines a chamber 38 located within the tubular housing 33. The microprocessor 26, transmitter 28 and antenna 30 are all sealing supported within the chamber 38 in the tubular housing 33.

The tubular housing 33 includes a first end 42 and a second end 44 which seal chamber 38 located in housing 33. The first end 42 of the tubular housing 33 includes groove means in the form of a substantially annular groove 50 therein which extends around the outer cylindrical surface 34 of the cylindrical wall 32. The annular groove 50 includes an annular surface 52 disposed substantially perpendicular to the longitudinal axis 40 of the tubular housing 33 and an annular surface 54 which intersects annular surface 52 and cylindrical surface 54. The second end 44 of the housing 33 includes one or more openings 46 therein through which conductors 24 pass.

Antenna 30 is supported contiguous to the first end 42 of the housing 33 as is illustrated in FIG. 2 which enables the antenna 30 to slightly protrude from the opening 20 in the pit cover 14 as is illustrated in FIGS. 1 and 2. The slight extension of antenna 30 above the top surface 16 of the pit cover 14 insures reliable propagation of signals from the antenna 30.

A detachable annular flange 60 is provided to, in part, surround the first end 42 of the tubular housing 33 and cooperates with the substantially annular groove 50 to support the tubular housing 33 within opening 20 in the pit cover 14. The detachable annular flange 60 includes a centrally located cylindrical opening 62 for receiving the first end 42 of the tubular housing 33 and projection means in the form of a substantially annular projection 64 for engaging with the substantially annular groove 50 on tubular housing 33 to support tubular housing 33 within the centrally located opening 62.

Projection 64 includes annular surface 66 which is disposed substantially parallel to annular surface 52 in groove 50 and which is adapted to engage with annular surface 52 when projection 64 "snaps" into groove 50 to support the tubular housing 33 within the cylindrical opening 62 in annular flange 60. The cylindrical opening 62 in annular flange 60 has a diameter which is slightly larger than the diameter of the outer surface 34 of the tubular housing 33. Projection 64 has a diameter which is substantially equal to the diameter of annular groove 50 and which is slightly less than the diameter of outer cylindrical surface 34 of the tubular housing. The diameter of the outer surface 34 of the tubular housing 33 is slightly less than the diameter of the opening 20 in the pit cover 14. Thus, the tubular housing 33 can be slidingly inserted into the opening 20 in the pit cover 14 from the bottom surface 18 to locate the first end 42 of the tubular housing in a position in which the first end 42 of the tubular housing projects through opening 20 in the pit cover 14 and is spaced apart from the top surface 16 of the pit cover 14. The detachable annular flange 60 can then be slid over the first end 42 of the tubular housing 33. As the tubular housing 33 slides within cylindrical opening 62 in flange 60 the projection 64 will flexibly engage with the cylindrical outer surface 34 of tubular housing 33 and slightly deform the annular flange 60 as the tubular housing slides within cylindrical opening 62. When the projection 64 aligns with groove 50 the projection 64 snaps into groove 50 to lock tubular housing 33 in place within the cylindrical opening 62 in flange 60 to prevent further relative movement between the tubular housing 33 and flange 60. Flange 60 has a diameter which is larger than the diameter of opening 20 in the pit cover 14 to prevent the flange 60 and the first end 42 of the tubular housing from subsequently passing through opening 20 when the flange 60 is secured to tubular housing 33. The flange 60 supports the tubular housing 33 within opening 20 on the top surface 16 of the pit cover 14.

The detachable annular flange 60, as is more fully illustrated in FIGS. 3 and 4, include a plurality of accurate sections 61 separated by slots 63 which allows the annular flange 60 to slightly deform when the tubular housing 33 is located in cylindrical opening 62 and the annular projection 64 engages the sides of the cylindrical opening 62. The flange 60 slightly deforms prior to annular projection 64 snapping into groove 50. Deformation of annular flange 60 enables the annular flange 60 to slide around tubular housing 33 and enables the annular projection 64, which has a diameter greater than that of cylindrical opening 62, to slide within cylindrical opening 62 and engage with groove 50 on the tubular housing 33. Annular projection 64 has a cross-sectional configuration which is the same as the cross-sectional configuration of groove 50 to enable the projection 64 to snap into groove 50 and lock tubular member 33 to the annular flange 60. The bottom surface 65 of the annular flange 60 is slightly concave, not illustrated, so that when the tubular housing 33 is biased in a downwardly direction as illustrated in the figures, the bottom of the flange 60 spreads out and becomes flat as the flange 60 is forced against the top surface 16 of pit cover 14.

The detachable annular flange 60 additionally provides for a simplified construction for the meter transmission unit 22 which allows the tubular housing 33 to be partially disassembled by removing the detachable annular flange 60 prior to shipping. Such a construction significantly reduces shipping and packing costs when compared with the prior art construction wherein the annular flange is permanently fixed to the tubular housing. Removing the detachable annular flange 60 from tubular housing 33 prior to packing and shipping simplifies the packing, reduces the size of the shipping containers for the meter transmission unit 22 and reduce the cost of shipping and packing.

The detachable annular flange 60 includes a substantially conical surface 66 having a first end 68 which is disposed contiguous to and substantially flush with the first end 42 of the tubular housing 33. The conical surface 66 on the detachable annular flange 60 is tapered toward the top surface 16 of the pit cover 14 and includes an end portion 70 which is disposed substantially flush with the top 16 of the pit cover 14. The conical surface 66 insures that the meter transmission unit 22 is impervious to traffic flow over the pit cover 14 and provides a multidirectional ramped surface to deflect traffic and structures such as snowplow blades which pass over the top of the meter transmission unit 22 when the meter transmission unit is disposed in a pit cover 14 which is located on a street. The first end 42 of tubular housing 33 includes an arcuate surface 43 which forms a continuation of the conical surface 66 when tubular housing 33 is secured within the cylindrical opening 62 in annular flange 60.

An annular collar 74 is provided for securing the meter transmission unit 22 tightly within opening 20 in the pit cover 14 and for securing the annular flange 60 tightly against the top surface 16 of the pit cover 14. The annular collar 74 includes an annular surface 72 which is engageable with an abutment means which project from the outer cylindrical surface 34 of the tubular housing 33. The abutment means are formed by an annular shoulder 71 located on the outer surface 34 of the tubular housing 33. The annular collar 74 engages with the annular shoulder 71 on the tubular housing 33 to limit movement of the annular collar 74 relative to the tubular housing 33.

Adjustment means in the form of bolt members 76 threadability extend through the annular collar 74 in a direction substantially parallel to the longitudinal axis 40 of the tubular housing 33. The plurality of bolt members 76 each includes an end 78 which is engageable with the bottom surface 18 of the pit cover 14. When collar 74 rests on shoulder 71 and bolts 76 are rotated after engaging with the bottom surface 18 of the pit cover 14 the extension of bolts 76 from the annular collar 74 pulls the bottom surface 65 of annular flange 60 toward the top surface 16 of the pit cover 14. Each of the bolt members 76 is individually adjustable to allow the plurality of bolt members 76 to engage with various portions of the bottom surface 18 of the pit cover 14. The individual adjustment of the bolt members 76 enables adjustment of the bolt members 76 to pull the tubular housing 33 uniformly in a downwardly direction as is illustrated in FIGS. 1 and 2 to engage the detachable annular flange 60 tightly with the top surface 16 of the pit cover 14. The annular collar 74 can be rotated about the cylindrical surface 34 of the tubular housing 33. Individual adjustment of the bolt members 76 and the rotability of collar 74 enables the bolt members 76 to squarely engage with various irregularities such as ribs, etc. disposed on the bottom surface 18 of the pit cover 14 while still maintaining the flange 60 tightly in engagement with the top surface 16 of the pit cover 14 without skewing the tubular housing 33 relative to the pit cover 14.

An annular spacer, not illustrated, could be placed around the outside of tubular housing 33 between the shoulder 71 and the annular collar 74 to shorten the length of bolt members 76 so that the bolt members 76 do not become excessively long and unstable. Such a spacer allows adjustment for large differences in the thickness of the pit lid 14.

It should be appreciated that when the meter transmission unit 22 is secured in the opening 20 in the pit cover 14, the longitudinal axis 40 of housing 33 is disposed substantially perpendicular to the pit cover 14 to insure that the annular flange 60 is tightly engaged with and disposed substantially flush on the top surface 16 of the pit cover 14. In the past, difficulty has been experienced in securing the meter transmission unit 22 with the tubular housing 33 disposed substantially perpendicular to the top surface 16 of the pit cover 14 to insure that the first end 42 of the housing 33 and the annular flange 60 are disposed substantially flush with the top surface 16 of the pit cover 14. If the detachable annular flange 60 is not disposed flush on the top surface 16 of the pit cover 14 as is illustrated, the detachable annular flange 60 will provide an obstruction for vehicles or an obstruction for a snowplow blade to hit when the flange 60 is skewed relative to the top surface 16 of pit cover 14. The irregularity of the bottom surface of the pit cover 14 makes it difficult to insure that the first end 42 of the tubular housing 33 is disposed substantially flush on the top surface of the pit cover 14. The provision of bolt members 76 which are individually adjustable and the rotability of collar 72 allows the bolt members 76 to be individually adjusted to securely engage with the bottom surface 18 of the pit cover 14 and to accommodate any irregularities in the bottom surface 18 of the pit cover 14 such as caused by supporting ribs 15 molded into the bottom surface of the pit cover.

When the meter transmission unit 22 is initially installed, the first end 42 of the tubular housing 33 is placed through the opening 20 in the pit cover 14 from the bottom side 18 of the pit cover. The sensor 25 which is connected to the utility meter 10 is sometimes larger than the opening 20 in the pit cover 14 which typically has a diameter of approximately 1¾". Since the sensor 25 is permanently connected to the housing 33 and can not pass through opening 20 in the pit cover 14, it is desirable to insert tubular housing 33 through the opening 20 in the pit cover 14 from the bottom side of the pit cover 14 so that sensor 25 is not required to pass through opening 20. After the first end 42 of the tubular housing 33 is passed through opening 20 in the pit cover 14, the first end 42 of the tubular housing 33 can extend above the top surface 16 of the pit cover and the detachable annular flange 60 can be snapped onto the end 42 of the tubular housing 33 by locating the annular projection 66 within the groove 50 in the first end 42 of the tubular housing. The individual bolt members 76 can then be adjusted to engage the ends 78 thereof with the bottom surface 18 of the pit cover 14 and to force the annular collar 74 against the shoulder 71 on housing 33. Individual adjustment of the bolt members 76 allows the bolt members 76 to tightly force the annular flange 60 on the first end 42 of the tubular housing 33 in a downwardly direction toward the top surface 16 of the pit cover 14 as is viewed in FIG. 2. The individual adjustment of the bolt means 76 allow the first end 42 of the housing to be rigidly affixed to the top surface 16 of the pit cover while maintaining the longitudinal axis 40 of the tubular housing 33 in a position substantially perpendicular to the top surface 16 of the pit cover 14.

While the tubular housing 33 has been illustrated as having a substantially circular cross-sectional configuration taken perpendicular to the longitudinal axis 40, other tubular configurations could be utilized without departing from the scope of the present invention. In addition, it should be appreciated that the tubular housing 33 could be constructed with the first end 42 as shown and the second end 44 having a larger diameter than the opening 20 in the pit cover as it is important that only the first end 42 pass through opening 20. Second end 44 is not required to pass through opening 20 in the pit cover. While the inner surface 36 of the tubular housing 33 is disclosed as being substantially cylindrical, other cross-section configurations such as a square or rectangle configuration could be utilized to define the chamber 38. Additionally, the bolts 76 could be replaced by screws or other types of fasteners which extend from annular collar 74.

While the tubular housing 33 has been disclosed as including a continuous annular groove 50 and the projections 66 on the annular flange 60 are disclosed as being continuous it should be appreciated that it is within the scope of the present invention to utilize other configurations which include a snap-type joint where the cooperating members utilize other than a continuous projection and/or groove. For example, discontinuous projections, i.e., a plurality of individual projections, could be utilized on the annular flange 60 to engage with matching discontinuous, i.e., individual, indentations, grooves, or slots located on the outer surface 34 of the tubular housing 33. When the individual projections align with the individual grooves on the tubular housing 33 the projections will flexibly snap into the grooves to lock the annular flange 60 around the first end 42 of the tubular housing 33. Additionally, while the abutment 71 has been disclosed as being a continuous annular shoulder a discontinuous shoulder or other types of abutments could be utilized on the housing 33 to limit movement of the annular collar 74 away from the first end 42 of the tubular housing 33.

It should also be appreciated that the annular collar 74 and shoulder 71 could be integrally formed on the outer cylindrical surface 34 of the tubular housing 33. For example, a tab-like member could be integrally formed with the tubular housing 33 on the cylindrical surface 34 to threadably support the bolt members 76 therein in the positions illustrated. The tab members would be fixed to the outer surface 34 of the tubular housing and integrally formed therewith and would include a threaded portion which extends in a vertical direction to receive bolt members 76. The bolt members 76 would then extend from the tab-like portions in a vertical direction to engage with the bottom surface 18 of the pit cover 14.

From the foregoing, it should be apparent that a new and improved meter transmission unit 22 for transmitting a signal indicative of utility usage at a utility meter 10 has been provided. The meter transmission unit 22 is adapted for use with a pit set utility meter 10 which is located in a pit 12 having a pit cover 14 for covering the top of the pit. The pit cover 14 includes a top surface 16, a bottom surface 18, and an opening 20 therein in which the meter transmission unit 22 is supported. The meter transmission unit 22 includes a sensor 25 for sensing utility usage at the utility meter 10, and a microprocessor 26 connected to the sensor 25 for storing utility usage information. The sensor 25 is spaced apart from the tubular housing 33 and is preferably permanently connected to the microprocessor 26 by conductors 24. A transmitter 28 is connected to the microprocessor 26 for transmitting a signal indicative of the utility usage-related information stored in the microprocessor 26. An antenna 30 is connected to the transmitter 28 for propagating the signal. A tubular housing 33 is provided having a longitudinal axis 40 and first and second ends 42, 44, respectively. The tubular housing 33 is defined by a substantially cylindrical wall 33 including a cylindrical outer surface 34 and a cylindrical inner surface 36 which cooperates with the first and second ends 42, 44 to define a chamber 38 located in the tubular housing 33 in which the microprocessor 26, transmitter 28 and antenna 30 are located. The first end 42 of the cylindrical housing 33 includes groove means in the form of the annular groove 50 having an annular surface 52 disposed substantially perpendicular to the longitudinal axis 40 of the tubular housing 33. The detachable annular flange 60 is adapted to support, on the top surface 16 of the pit cover 14, the tubular housing 33 on the annular surface 52 of the groove 50 when projection means 66 in the annular flange 60 engages groove 50. An annular collar 74 is provided and includes adjustment means in the form of the plurality of bolt members 76 which extend through the annular collar 74 in a direction substantially parallel to the longitudinal axis 40 of the tubular housing 33. The bolt members 76 include ends 78 which engage with the bottom surface 18 of the pit cover 14 to pull the tubular housing 33 downwardly and the annular flange 60 tightly toward the top surface 16 of the pit cover 14. The adjustment means 76 is adjustable in a vertical direction after the annular collar 74 engages with abutment means 71 located on the outer cylindrical surface 34 of the tubular housing 33.

What I claim is:

1. A meter transmission unit for transmitting a signal indicative of utility usage at a utility meter with which the meter transmission unit is associated and which is adapted for use with a pit set utility meter which is located in a pit having a pit cover for covering the top of the pit in which the utility meter is set, the pit cover having a top surface, a bottom surface, and an opening therein in which the meter transmission unit is supported, the meter transmission unit comprising a sensor for sensing utility usage at the associated utility meter, a microprocessor connected to said sensor for storing the utility usage information, a transmitter associated with said microprocessor for transmitting a signal indicative of the utility usage related information stored in said microprocessor, an antenna connected to said transmitter for propagating said signal, a tubular housing having a longitudinal axis and defined in part by a substantially cylindrical wall disposed substantially coaxial to said longitudinal axis having an outer surface and an inner surface which defines in part a chamber in which microprocessor, said transmitter and said antenna are located, said tubular housing having first and second ends which cooperate with said inner surface to define said chamber, said cylindrical wall having a diameter at the outer surface thereof which is slightly less than the diameter of the opening in the pit cover to allow at least a portion of the tubular housing to pass through the opening in the pit cover, groove means located at said first end of said tubular housing for supporting said tubular housing in the opening in the pit cover, and a detachable annular flange for surrounding and engaging with said first end of said tubular housing to support said tubular housing on the top surface of the pit cover, said detachable annular flange having a cylindrical opening centrally located therein for receiving said first end of said tubular housing therein and projection means located within said cylindrical opening which are adapted to be received within said groove means in said tubular housing, said projection means cooperating with said groove means to support said tubular housing within said cylindrical opening in said annular flange and within the opening in the pit cover when said annular flange is located on the top surface of the pit cover, said detachable annular flange having a substantially conical surface which at one end is substantially flush with said first end of said tubular housing and which is tapered toward the top surface of the pit cover, a collar surrounding said outer surface of said substantially cylindrical wall, abutment means located on said outer surface of said substantially cylindrical wall for engaging with said collar and limiting axial movement of said collar relative to said tubular housing in a direction away from said first end of said tubular housing, and a plurality of individually adjustable means extending between said collar and the bottom surface of the pit cover for forcing said collar against said abutment means to bias the tubular housing in a direction away from the bottom surface of the pit cover to force said detachable annular flange tightly toward the top surface of the pit cover.

2. A meter transmission unit for transmitting a signal indicative of utility usage as defined in claim 1 wherein said sensor is adapted to be operatively connected to a utility meter with which the meter transmission unit is associated and is spaced apart from said tubular housing, and further including conductor means permanently connecting said sensor to said microprocessor located within said chamber in said tubular housing, said conductor means passing through said second end of said housing for directing utility usage information from said sensor to said microprocessor.

3. A meter transmission unit for transmitting a signal indicative of utility usage at a utility meter as defined in claim 1 wherein said first end of said tubular housing has a generally arcuate cross-sectional configuration a portion of which terminates at said outer surface of said tubular housing and which portion of said first end of said tubular housing is adapted to be disposed substantially flush to said one end of said substantially conical surface of said detachable annular flange.

4. A meter transmission unit for transmitting a signal indicative of utility usage as defined in claim 1 wherein said conical surface on said detachable annular flange includes another end thereof which is tapered substantially into engagement with the top surface of the pit cover when the meter transmission unit is located in the opening in the pit cover and supported on the top surface of the pit cover.

5. A meter transmission unit for transmitting a signal indicative of utility usage as defined in claim 1, wherein said plurality of adjustable means includes a plurality of bolt members each of which extends through said collar in a direction substantially parallel to the longitudinal axis of said tubular housing and each of which includes an end thereof which is engageable with the bottom surface of the pit cover when the meter transmission unit is supported in the opening in the pit cover, each of said plurality of said bolt members being individually adjustable to force said detachable annular flange tightly toward the top surface of the pit cover.

6. A meter transmission unit for transmitting a signal indicative of utility usage as defined in claim 1 wherein said antenna is disposed contiguous to said first end of said housing and is in part located above the top surface of the pit cover when said tubular housing is located in the opening in the pit cover to insure reliable propagation of said signal.

7. A meter transmission unit for transmitting a signal indicative of utility usage as defined in claim 1 wherein the cylindrical outer surface of said tubular housing has a diameter at the first end of the tubular housing which is less than the diameter of the opening in the pit cover and which enables the first end of the tubular housing to be inserted from the bottom of the pit cover through the opening in the pit cover.

8. A meter transmission unit for transmitting a signal indicative of utility usage as defined in claim 1 wherein said groove means is a substantially annular groove located in said first end of said tubular housing, and said projection means is a substantially annular projection located within said cylindrical opening in said annular flange, said substantially annular projection being adapted to be received in said substantially annular groove to support said tubular housing within said cylindrical opening in said annular flange.

9. A meter transmission unit for transmitting a signal indicative of utility usage as defined in claim 8, wherein said plurality of adjustable means includes a plurality of bolt members each of which extends through said collar in a direction substantially parallel to said longitudinal axis of said tubular housing and each of which includes an end thereof which is engageable with the bottom surface of the pit cover when the meter transmission unit is supported in the opening in the pit cover, each of said plurality of said bolt member being individually adjustable to force said detachable annular flange tightly toward the top surface of the pit cover.

10. A meter transmission unit for transmitting a signal indicative of utility usage as defined in claim 9 wherein said individual adjustment of said plurality of bolt members forces said collar against said abutment on said tubular housing to force said abutment away from the bottom surface of the pit cover to force said detachable annular flange tightly into engagement with the top surface of the pit cover.

11. A meter transmission unit for transmitting a signal indicative of utility usage as defined in claim 10 wherein said antenna is disposed contiguous to said first end of said housing and is in part located above the top surface of the pit cover when said tubular housing is supported in the opening in the pit cover to insure reliable propagation of said signal.

12. A meter transmission unit for transmitting a signal indicative of utility usage at a utility meter with which the meter transmission unit is associated and which is adapted for use with a pit set utility meter which is located in a pit having a pit cover for covering the top of the pit in which the utility meter is set, the pit cover having a top surface, a bottom surface, and a opening therein in which the meter transmission unit comprising a sensor for sensing utility usage at the associated utility meter, a microprocessor connected to said sensor for storing the utility usage information, a transmitter associated with said microprocessor for transmitting a signal indicative of the utility usage related information stored in said microprocessor, an antenna connected to said transmitter for propagating said signal, a tubular housing having a longitudinal axis, and defined in part by a substantially cylindrical wall disposed substantially coaxial to said longitudinal axis having an outer surface and an inner surface which defines in part a chamber in which said microprocessor, said transmitter and said antenna are located, said tubular housing having first and second ends which cooperate with said inner surface to define said chamber, said cylindrical wall having a diameter at the outer surface thereof which is slightly less than the diameter of the opening in the pit cover to allow at least a portion of the tubular housing to pass through the opening in the pit cover, groove means located at said first end of said tubular housing for supporting said tubular housing in the opening in the pit cover, and a detachable flange for surrounding and engaging with said first end of said tubular housing to support in the opening in the pit cover said tubular housing on the top surface of the pit cover, said detachable flange having a cylindrical opening centrally located therein for receiving said first end of said tubular housing therein and projection means located within said cylindrical opening which are adapted to be received within said groove means on said tubular housing, said projection means projecting into and engaging with said groove means to support said tubular housing within said cylindrical opening in said detachable flange when said detachable flange is supported on the top surface of the pit cover, said projection means being deformable to enable said projection means to deform when said tubular housing is inserted into said cylindrical opening in said detachable flange to project into and engage said groove means when said groove means is aligned with said projection means, said detachable flange having a substantially conical surface which at one end is substantially flush with said first end of said tubular housing when said tubular housing is supported within said cylindrical opening in said detachable flange, said conical surface being tapered toward the top surface of the pit cover.

13. A meter transmission unit for transmitting a signal indicative of utility usage as defined in claim 12 wherein said projection means includes a substantially annular projection located within said cylindrical opening in said detachable flange, said substantially annular projection being adapted to be received in said groove means on said tubular housing within said cylindrical opening in said detachable flange when said detachable flange surrounds and is engaged with said first end of said tubular housing.

14. A meter transmission unit for transmitting a signal indicative of utility usage as defined in claim 12 wherein said sensor is adapted to be operatively connected to a utility meter with which the meter transmission unit is associated and is spaced apart from said tubular housing, and further including conductor means permanently operatively connecting said sensor to said microprocessor located within said chamber in said tubular housing, said conductor means passing through said second end of said housing for directing utility usage information from said sensor to said microprocessor.

15. A meter transmission unit for transmitting a signal indicative of utility usage at a utility meter as defined in claim 12 wherein said first end of said tubular housing has a generally arcuate cross-sectional configuration a portion of which terminates at said outer surface of said tubular housing, said portion of said first end of said tubular housing being adapted to be disposed substantially flush to said one end of said substantially conical surface of said detachable flange when said tubular housing is located within said cylindrical opening in said detachable flange.

16. A meter transmission unit for transmitting a signal indicative of utility usage as defined in claim 12 wherein said conical surface on said detachable flange includes another end thereof which is tapered substantially into engagement with the top surface of the pit cover when the meter transmission unit is located in the opening in the pit cover and supported by said detachable flange on the top surface of the pit cover.

17. A meter transmission unit for transmitting a signal indicative of utility usage as defined in claim 12 wherein said antenna is disposed contiguous to said first end of said housing and is in part located above the top surface of the pit cover when said tubular housing is located in the opening in the pit cover to insure reliable propagation of said signal.

18. A meter transmission unit for transmitting a signal indicative of utility usage as defined in claim 12 wherein said groove means includes a substantially annular groove located on said first end of said tubular housing with said substantially annular groove being located on said outer surface of said cylindrical wall at said first end of said tubular housing and being disposed substantially coaxial to said longitudinal axis of said tubular housing.

19. A meter transmission unit for transmitting signal indicative of utility usage as defined in claim 18 wherein said projection means includes a substantially annular projection located within said cylindrical opening in said detachable flange, said substantially annular projection being adapted to be received in said substantially annular groove on said tubular housing when said tubular housing is located within said cylindrical opening in said detachable flange when said detachable flange surrounds and is engaged with said first end of said tubular housing.

20. A meter transmission unit for transmitting a signal indicative of utility usage as defined in claim 19 wherein said detachable flange has an annular configuration and said cylindrical opening in said detachable flange is disposed substantially coaxial to said longitudinal axis of said tubular housing.

21. A meter transmission unit for transmitting a signal indicative of utility usage as defined in claim 12 further including adjustment means extending between said tubular housing and the bottom surface of the pit cover for engaging with the bottom surface of the pit cover to force said tubular housing away from the bottom surface of the pit cover in a direction substantially parallel to said longitudinal axis of said tubular housing and for forcing said detachable annular flange against the top surface of the pit cover.

22. A meter transmission unit for transmitting a signal indicative of utility usage as defined in claim 21, wherein said adjustment means includes an annular collar for surrounding said tubular housing and a plurality of bolt members each of which extends through said annular collar in a direction substantially parallel to the longitudinal axis of said tubular housing and each of which includes an end thereof which is engageable with the bottom surface of the pit cover when the meter transmission unit is supported in the opening in the pit cover, each of said plurality of said bolt members being individually adjustable to force said detachable flange tightly toward the top surface of the pit cover.

23. A meter transmission unit for transmitting a signal indicative of utility usage as defined in claim 22 wherein said tubular housing includes a shoulder located on the outer surface of said cylindrical, and said individual adjustment of said plurality of bolt members bias said annular collar against said shoulder to bias said tubular housing away from the bottom surface of the pit cover to tightly engage said detachable flange with the top surface of the pit cover.

24. A meter transmission unit for transmitting a signal indicative of utility usage as defined in claim 23 wherein said antenna is disposed contiguous to said first end of said tubular housing and is in part located above the top surface of the pit cover when said tubular housing is located in the opening in the pit cover to insure reliable propagation of said signal.

25. A meter transmission unit for transmitting a signal indicative of utility usage at a utility meter with which the meter transmission unit is associated and which is adapted for use with a pit set utility meter which is located in a pit having a pit cover for covering the top of the pit in which the utility meter is set, the pit cover having a top surface, a bottom surface, and an opening therein in which the meter transmission unit is supported, the meter transmission unit comprising a sensor for sensing utility usage at the associated utility meter, a microprocessor connected to said sensor for storing the utility usage information, a transmitter associated with said microprocessor for transmitting a signal indicative of the utility usage related information stored in said microprocessor, an antenna connected to said transmitter for propagating said signal, a tubular housing having a longitudinal axis and defined in party by a cylindrical wall disposed substantially coaxial to said longitudinal axis having an outer surface and an inner surface which defines in part a chamber in which microprocessor, said transmitter and said antenna are located, said tubular housing having first and second ends which cooperate with said inner surface to define said chamber, said cylindrical wall having a diameter at the outer surface thereof which is slightly less than the diameter of the opening in the pit cover to allow at least a portion of the tubular housing to pass through the opening in the pit cover, groove means located at said first end of said tubular housing for supporting said tubular housing in the opening in the pit cover, and a detachable annular flange for surrounding and engaging with said first end of said tubular housing to support said tubular housing on the top surface of the pit cover, said detachable annular flange having a cylindrical opening centrally located therein for receiving said first end of said tubular housing therein and projection means located within said cylindrical opening which are adapted to be received within said groove means in said tubular housing, said projection means cooperating with said groove means to support said tubular housing within said cylindrical opening in said annular flange and within the opening in the pit cover when said annular flange is located on the top surface of the pit cover, said detachable annular flange having a substantially conical surface which at one end is substantially flush with said first end of said tubular housing and which is tapered toward the top surface of the pit cover, a collar surrounding said outer surface of said substantially cylindrical wall, abutment means located on said outer surface of said substantially cylindrical wall for engaging with said collar and limiting axial movement of said collar relative to said tubular housing in a direction away from said first end of said tubular housing, and a plurality of adjustable means extending between said collar and the bottom surface of the pit cover for forcing said collar against said abutment means to bias the tubular housing in a direction away from the bottom surface of the pit cover to force said detachable annular flange tightly toward the top surface of the pit cover wherein said groove means is a substantially annular groove located in said first end of said tubular housing, said projection means being a substantially annular projection located within said cylindrical opening in said annular flange, said substantially annular projection being adapted to be received in said substantially annular groove to support said tubular housing within said cylindrical opening in said annular flange, said substantially annular projection being deformable to enable said substantially annular projection to deform when said tubular housing is inserted into said cylindrical opening in said annular flange and said substantially annular projection engages with said outer cylindrical surface of said tubular housing and projects into and engages in said substantially annular groove in said tubular housing when said groove is aligned with said substantially annular projection.

\* \* \* \* \*